(12) United States Patent
Gumbrecht et al.

(10) Patent No.: US 9,267,616 B2
(45) Date of Patent: Feb. 23, 2016

(54) METHOD FOR CONTROLLING VALVES DURING THE THERMOCYCLIZATION OF A SUBSTANCE FOR THE PURPOSE OF POLYMER CHAIN REACTION (PCR) AND ASSOCIATED ARRANGEMENT

(75) Inventors: Walter Gumbrecht, Herzogenaurach (DE); Peter Paulicka, Erlangen (DE); Manfred Stanzel, Erlangen (DE)

(73) Assignee: Boehringer Ingelheim Vetmedica GmbH, Ingelheim am Rhein (DE)

( * ) Notice: Subject to any disclaimer, the term of this patent is extended or adjusted under 35 U.S.C. 154(b) by 1815 days.

(21) Appl. No.: 11/665,297
(22) PCT Filed: Oct. 14, 2005
(86) PCT No.: PCT/EP2005/055269
§ 371 (c)(1), (2), (4) Date: Apr. 13, 2007
(87) PCT Pub. No.: WO2006/042825
PCT Pub. Date: Apr. 27, 2006

(65) Prior Publication Data
US 2007/0265439 A1 Nov. 15, 2007

(30) Foreign Application Priority Data
Oct. 15, 2004 (DE) .......................... 10 2004 050 510

(51) Int. Cl.
*C12M 1/00* (2006.01)
*F16K 99/00* (2006.01)
(Continued)

(52) U.S. Cl.
CPC ....... *F16K 99/0001* (2013.01); *B01L 3/502738* (2013.01); *B01L 7/52* (2013.01);
(Continued)

(58) Field of Classification Search
CPC ................. B01L 2400/0661; B01L 3/502738; F16K 99/0038; F16K 99/0001; F16K 99/0036; F16K 99/0044; C08L 2201/12

USPC ............................................. 435/285.1–286.7
See application file for complete search history.

(56) References Cited

U.S. PATENT DOCUMENTS 5,325,880 A * 7/1994 Johnson et al. ............... 137/1
5,529,279 A * 6/1996 Beatty et al. ................. 251/11
(Continued)

FOREIGN PATENT DOCUMENTS

EP         1 174 182 A2    1/2002
WO       WO-90/15430 A1   12/1990
(Continued)

OTHER PUBLICATIONS

Shoji et al. "Microflow Devices and Systems". Journal of Micromechanics and Microengineering, New York, NY, US, vol. 4, No. 4, pp. 157-171, Dec. 1994.
(Continued)

*Primary Examiner* — Michael Hobbs
*Assistant Examiner* — Liban Hassan
(74) *Attorney, Agent, or Firm* — Roberts Mlotkowski Safran & Cole, PC; David S. Safran

(57) ABSTRACT

At least one embodiment of the invention relates to an arrangement for thermocyclization of a substance. At least one embodiment of the invention also relates to a method for the thermocyclization of a substance, including: the controllable valves automatically close the PCR chamber after the test fluid has been introduced into the PCR-chamber, and the properties for the memory metal or bimetal elements are used for closing the valves when a predetermined temperature has been exceeded. As a result, the mechanical actuator, which is used to actuate the valves, is thermally coupled to the heating/cooling element in order to carry out the thermocyclization.

10 Claims, 2 Drawing Sheets

(51) Int. Cl.
  *B01L 3/00* (2006.01)
  *B01L 7/00* (2006.01)
(52) U.S. Cl.
  CPC ........ *F16K 99/0036* (2013.01); *F16K 99/0038* (2013.01); *F16K 99/0044* (2013.01); *B01L 2300/0877* (2013.01); *B01L 2300/1822* (2013.01); *B01L 2400/0633* (2013.01); *B01L 2400/0661* (2013.01); *C08L 2201/12* (2013.01); *F16K 2099/0084* (2013.01)

(56) References Cited

U.S. PATENT DOCUMENTS

| | | | |
|---|---|---|---|
| 5,755,942 A | 5/1998 | Zanzucchi et al. | |
| 2001/0036672 A1 | 11/2001 | Anderson et al. | |
| 2001/0048895 A1 | 12/2001 | Virtanen | |
| 2002/0022261 A1 * | 2/2002 | Anderson et al. | 435/287.2 |
| 2002/0137218 A1 | 9/2002 | Mian et al. | |
| 2004/0053290 A1 * | 3/2004 | Terbrueggen et al. | 435/6 |
| 2004/0108479 A1 * | 6/2004 | Garnier et al. | 251/129.01 |

FOREIGN PATENT DOCUMENTS

| | | |
|---|---|---|
| WO | WO-2004/034028 A2 | 4/2004 |
| WO | WO 2004/042357 A2 | 5/2004 |

OTHER PUBLICATIONS

German Office Action Aug. 4, 2005.
ISR dated Feb. 3, 2006 for corresponding International Application No. PCT/EP2005/055269.

* cited by examiner

METHOD FOR CONTROLLING VALVES DURING THE THERMOCYCLIZATION OF A SUBSTANCE FOR THE PURPOSE OF POLYMER CHAIN REACTION (PCR) AND ASSOCIATED ARRANGEMENT

PRIORITY STATEMENT

This application is the national phase under 35 U.S.C. §371 of PCT International Application No. PCT/EP2005/055269 which has an International filing date of Oct. 14, 2005, which designated the United States of America and which claims priority on German Patent Application number 10 2004 050 510.1 filed Oct. 15, 2004, the entire contents of which are hereby incorporated herein by reference.

FIELD

Embodiments of the invention generally relate to a method for valve control during the thermocycling of a substance for the purpose of PCR. Embodiments of the invention furthermore generally relate to the associated arrangement for carrying out the method.

BACKGROUND

In order to carry out a PCR (Polymerase Chain Reaction) in a "lab-on-a-chip" system, according to our own application PCT/EP2005/055303 with the same application priority, the PCR chamber is filled via a feed channel and emptied via a discharge channel. Temperatures of between 50 and 95° C. are set up during the thermocycling for the PCR. Owing to degassing of dissolved air and thermal expansion of water, the pressure in the chamber thereby increases and displacement of the liquid can take place, leading to uncontrolled conditions during the PCR. In order to avoid this, both the feed and the discharge of the PCR chamber must be closed.

In order to close the PCR chamber, a mobile, resilient membrane or foil may be pressed onto the respective channel, for example the feed channel. To this end, a mechanical force must be exerted. Various valve-drive systems are known from the prior art.

WO 2004/042357 A2 discloses the use of microvalves for microfluidic instruments according to the "lab-on-a-chip" type. This document refers to a prior publication in Micromechanics & Microengineering, New York, N.Y., US, vol. 4, No. 4, December 1994, pages 157 to 171, ISSN XP000863761, in which an overview of a very wide variety of valve designs in microfluidic instruments of the associated actuators are given. As examples, electromagnetically, electrostatically, pneumatically, piezoelectrically or by means of shape changes by memory metals or bimetals in conjunction with counter pressure springs are given. A specific application in connection with a PCR is not revealed therefrom.

For the development of a cost-effective, small-volume device, especially for PCR on a "lab-on-a-chip" arrangement, a suitable principle must be selected from the known systems since increasing the complexity would entail an increase in the costs and the device volume.

SUMMARY

At least one embodiment of the invention specifies an improved method for valve control during the thermocycling in the scope of a PCR and to provide an associated arrangement.

At least one embodiment of the invention thus relates to such valve control during the thermocycling of a substance for the purpose of PCR, the PCR chamber being automatically closed by controllable valves. The thermal properties of metals are employed for this, by virtue of the fact that they are in direct contact with the heating/cooling actuator needed for the PCR. At least for closing the valves when a predetermined temperature is exceeded, the thermal properties of metals are thereby utilized by employing either memory metal elements or bimetallic elements which define the closure position of the valves in the hot state. When the predetermined temperature is fallen below, on the other hand, spring elements are used which cause the valves to open.

Advantageously, at least one embodiment of the invention exploits the technique of memory metals or bimetals. Especially for memory metals, the accurately definable switchover temperature leads to an optimal closure response, which may advantageously be used in valves for PCR chambers. Another particular advantage is that the intended use of a memory metal-driven valve during the PCR does not require its own thermal actuator for heating or cooling, which would not be compatible with the aims of the device development (costs, overall size). Instead, the heating and cooling elements already provided for the thermocycling are used as an actuator for the memory metal technique, their specific arrangement and their operation being essential.

BRIEF DESCRIPTION OF THE DRAWINGS

Further details and advantages of the invention will be found in the following figure description of example embodiments with the aid of the drawings in conjunction with the patent claims.

Respectively in a schematic representation.

DETAILED DESCRIPTION OF THE EXAMPLE EMBODIMENTS

Figure 1:
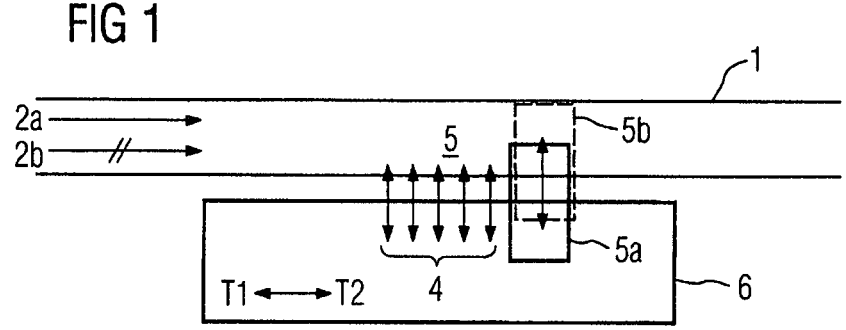
FIG. 1 schematically shows the principle of an embodiment of the invention.

FIG. 1 represents a fluidic channel 1, which has cross-sectional dimensions of from 10 µm to a few mm. The fluidic channel 1 is in thermal contact 4 with a heating/cooling actuator 6. A mechanical actuator 5 as a valve is likewise in contact with the heating/cooling actuator 6. The mechanical actuator is, for example, a combination of memory metal and a spring element, as illustrated with the aid of FIGS. 2 and 3.

The heating/cooling actuator can set up at least two temperatures $T_1$ and $T_2$. The mechanical actuator 5 thereby adopts two different positions 5a and 5b, such that flow in the channel 1 is enabled in position 5a/2a and the flow in the channel 1 is interrupted in position 5b/2b.

If the mechanical actuator is operated so that the valve 5 closes when exceeding a temperature which is low but above room temperature (for example 40° C.), then a sample liquid in which a PCR reaction is intended to take place can be enclosed in a predetermined volume element during the heating and kept in this volume element during the thermocycling between 50° C. and 95° C. After the conclusion of the thermocycling, the valve 5 opens upon cooling, i.e. falling below 40° C., and the PCR product can be pumped out from the PCR chamber.

Figure 2:
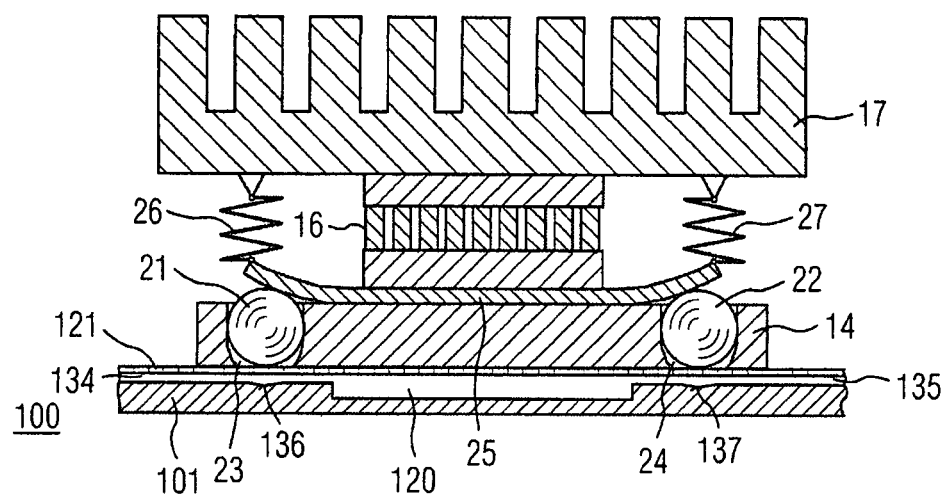
FIG. 2 and FIG. 3 show a correspondingly constructed valve arrangement in the open and closed states.
Figure 3:
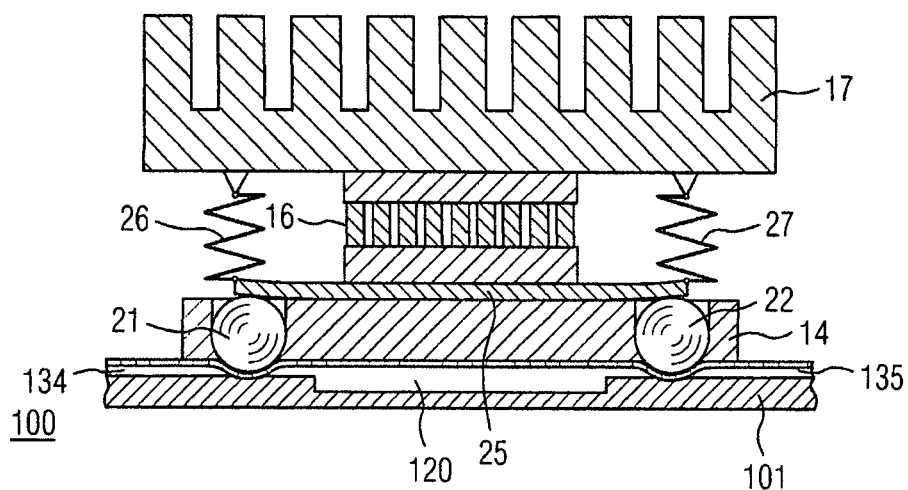

FIGS. 2 and 3 represent a detail of the thermo-actuator region with heating/cooling, as described in detail particularly in the parallel patent application by the Applicant with the same application priority. A cartridge (card) 100 is inserted into the actuator region, so that a PCR can be carried out there.

In detail, the card includes a so-called cartridge 100 made of a planar plastic body 101, which is provided with structures including microchannels or microcavities and on which a film 121 is applied. The planar plastic body 101 contains a recess as the sample chamber 120. Flow channels 134 and 135 serve as a feed and discharge for the sample liquid.

A thermal coupling plate 14, an instrument with Peltier elements 16 and a unit with heat sinks 17 are furthermore indicated.

On the other side of the cartridge 100 there is likewise an equivalent arrangement including a thermal coupling plate 14, an instrument with Peltier elements 16 and a unit with heat sinks 17, which is not represented in FIGS. 2 and 3.

What is essential in FIGS. 2 and 3 is that the thermal coupling plate 14 contains recesses 23, 24, into which e.g. spherical sealing elements 21 and 22 can engage. The sealing elements 21 and 22 press via their circumference on the film 121 of the cartridge 100, to which end suitable recesses 136 and 137 are provided in the plastic body.

On the rear side, between the thermal coupling plate 14 and the unit with the Peltier elements 16, there is a temperature responsive element 25 made of a memory metal which is respectively supported by spring elements 26 and 27 on the end side.

Memory metals are known from the prior art. They are intended to mean metallic materials which microscopically change their structure by diffusionless (martensitic) phase transitions at a defined temperature. These materials are defined by alloys with particular alloy components. Suitable therefor, in particular, are copper-based or nickel-based alloys, for example Cu—Zn—Al or Ni—Ti.

With a suitable configuration of an element made of such a material, the microscopic structural change can be converted into a predetermined macroscopic shape change, so that such memory metals are also widely referred to as shape memory alloys.

By the selection of suitable alloy components, it is possible to dictate the defined transition temperatures. Shaped elements which change their shape when reaching this temperature, and therefore in particular perform a switching function, can thus be formed from memory metals.

In the structure according to FIGS. 2/3 with the element 25, the following functions are obtained: when falling below a predetermined temperature, the memory metal element 25 has the position according to FIG. 2. It is readily deformable in particular at room temperature, and is held by the spring elements 26/27 in the shape represented in FIG. 2. The memory metal element 25 thus does not press on the valve elements 21 and 22, which means that both the valves 22, 22' are open and sample liquid can flow into the analysis chamber 33.

If the temperature now increases, then the memory effect sets in i.e. the memory metal element 25 returns into its preprogrammed, rigid shape and overcomes the spring force of the springs 26 and 27. The film 32 is deformed by the pressure of the valve elements 21 and 22, and the feed 34 and 35 of the flow channel is closed/sealed.

Figure 4:
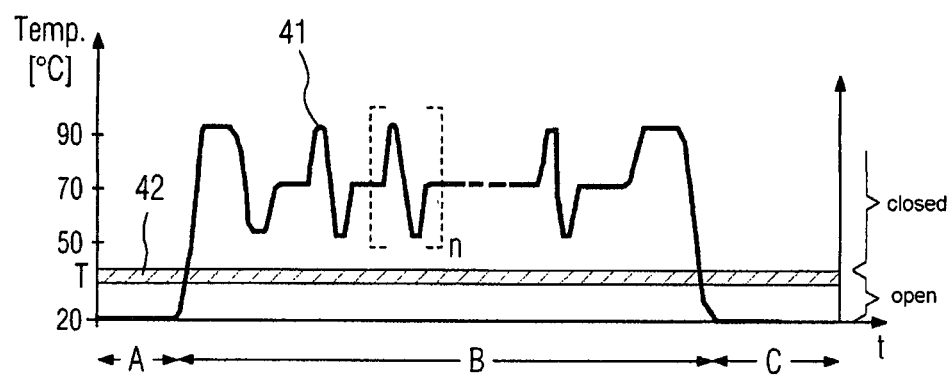
FIG. 4 shows the time profile of a thermocycling curve with use of the valve control according to an embodiment of the invention.

FIG. 4 represents the temperature profile as a function of time during the PCR: the time is plotted on the abscissa and the temperature in the range of between 20° C. (room temperature) and about 95° C. (upper limit temperature of the thermocycling) is plotted on the ordinate.

In the region A, the PCR chamber is filled with the valves open. Heating subsequently takes place, the memory effect of the element 25 coming into play at the temperature T=45° C. so that, for example, the valve balls 21, 22 press the film onto the card base body 101 with a constant force and therefore tightly close the sample chamber 133. A liquid flow between the sample chamber and the outer region is now no longer possible.

In the region B, the PCR can now be carried out: the temperature is increased to about 95° C. and varies periodically according to a predetermined program, corresponding to the graph 41, between this value and a lower temperature of about 50° C. with an intermediate plateau of about 70° C. It is possible to carry out n cycles.

After conclusion of the PCR, cooling is carried out in the region C and the PCR chamber is emptied. The PCR product can be transported in the cartridge for further analysis.

With the described valve arrangement, opening and closure of the sample chamber is thus possible in a straightforward way, opening respectively taking place when falling below a lower limit temperature after carrying out the PCR. Since this valve arrangement is readily integratable into the thermal actuator with heating and cooling, a particularly simple problem solution is obtained for the specific application purpose.

Optionally, instead of the element 25 made of memory metal, it is also possible to use elements made of bimetal i.e. metal layers with different expansion coefficients.

Here, however, a modified closure function is obtained owing to the continuous shape change of the bimetallic element.

As shown by FIG. 4, the valve element made of memory metal has a steep closure function, which is illustrated therein by the shaded region 42. This narrow region 42 is particularly important for PCR, particularly in the case of thermal coupling to the heating/cooling actuator for the PCR.

The specific combination of the memory metal-driven valves with the thermocycling unit thus leads to considerable savings in the device development as regards costs and overall size.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for controlling valves during thermocyclisation of a substance for the purpose of polymerase chain reaction comprising the steps of:
   providing a cartridge made of a planar plastic body having structures including sealing element receiving recesses and microchannels or microcavities, formed therein and over a top surface of which a film has been applied to create a sample chamber recess and flow channels feeding and discharging sample liquid,
   placing the cartridge under a thermal coupling plate which contain recesses and disposing sealing elements in the recesses,
   placing a temperature responsive element over the thermal coupling plate and in contact with the sealing elements in the recesses,
   transferring heat to the temperature responsive element and the sample chamber recess by means of a heating element via the thermal coupling plate, so as to cause the temperature responsive element to apply sufficient pressure to the sealing elements to press the sealing elements on the film of the cartridge deflecting the film into the sealing element receiving recesses to close the sample chamber recess in the planar plastic body, using the transferred heat to perform a polymerase chain reaction of a sample in the sample chamber recess, and then cooling the sample chamber.

2. The method as claimed in claim 1, wherein the sealing elements are released from the sealing element receiving recesses so that the sample chamber recess is opened after the thermocycling has been concluded.

3. The method as claimed in claim 1, wherein said temperature responsive element is made of a memory metal in order to utilize thermal properties of the memory metal.

4. The method as claimed in claim 1, wherein said temperature responsive element is made of a bimetal to utilize thermal properties of the bimetal.

5. The method as claimed in claim 4, wherein the bimetallic temperature responsive element has an original shape that is modified when a determined temperature is exceeded to apply said pressure to the sealing elements.

6. The method as claimed in claim 4, wherein the original shape of the bimetallic element is adopted when a determined temperature is fallen below.

7. The method as claimed in claim 6, wherein the determined temperature lies between 20° and 50° C.

8. The method as claimed in claim 5, wherein the determined temperature lies between 20° and 50° C.

9. The method of claim 1, wherein
springs contact respective ends of the temperature responsive element, and
the temperature responsive element extends in a direction parallel with an upper surface of the cartridge when force exerted by said springs is overcome due to said transferring of heat to the temperature responsive element.

10. The method of claim 1, wherein,
said temperature responsive element is non-planar when said pressure is removed from the sealing elements, and
said temperature responsive element is substantially planar when said pressure has been applied to the sealing elements.

* * * * *